No. 849,027. PATENTED APR. 2, 1907.
C. P. STEINMETZ.
INTEGRATING PHOTOMETER.
APPLICATION FILED OCT. 13, 1902.
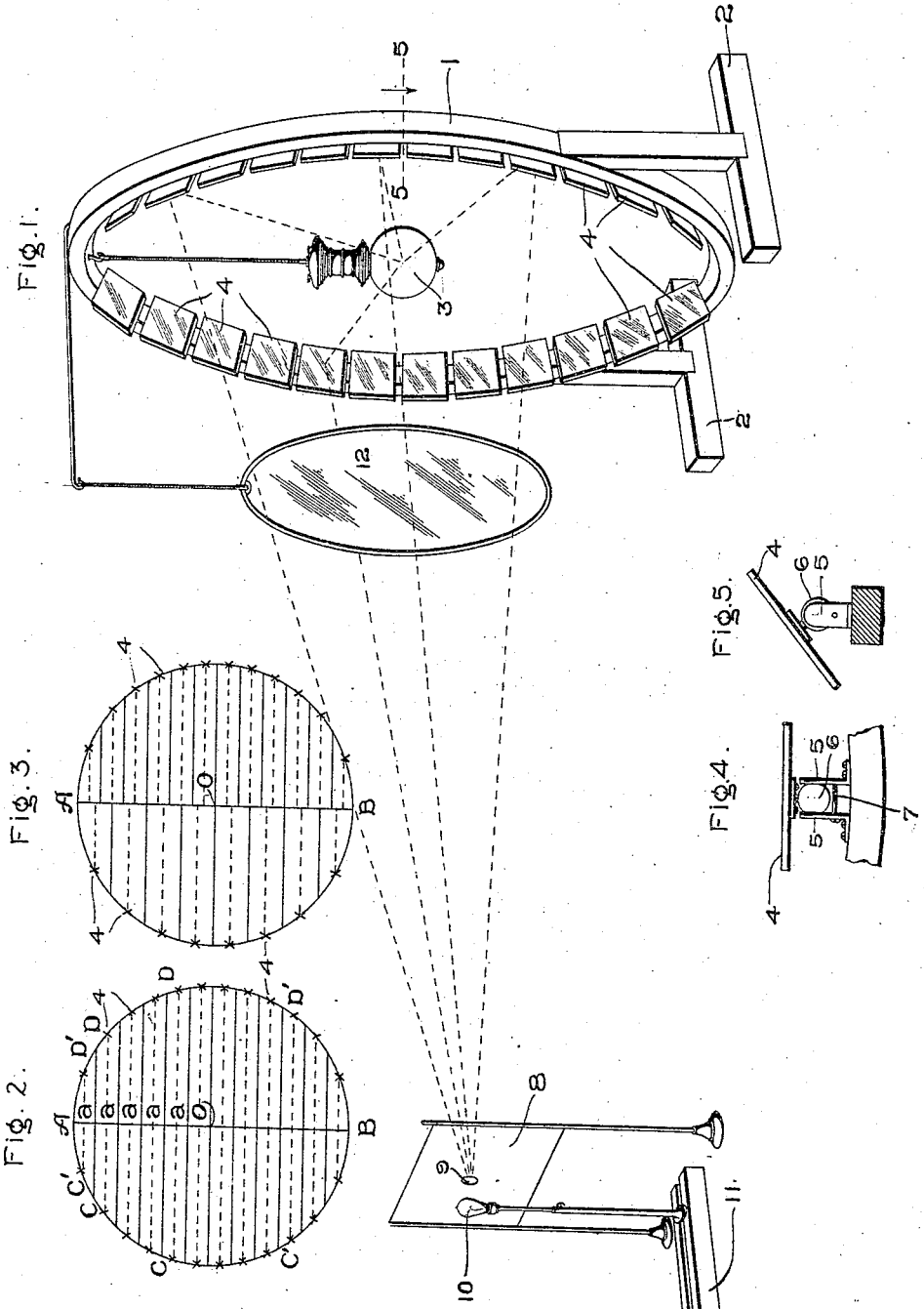
WITNESSES:
George A. Thornton
Areew Oxford
INVENTOR:
Charles P. Steinmetz
by Albt A. Davis
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

INTEGRATING PHOTOMETER.

No. 849,027.     Specification of Letters Patent.     Patented April 2, 1907.

Application filed October 13, 1902. Serial No. 127,039.

*To all whom it may concern:*

Be it known that I, CHARLES P. STEINMETZ, a citizen of the United States, residing at Schenectady, in the county of Schenectady, State of New York, have invented certain new and useful Improvements in Integrating Photometers, of which the following is a specification.

In order to determine exactly the total flux or spherical intensity of light issuing from a luminous source, it would be necessary to determine the intensity at each point on the surface of a sphere having the source of light at its center; but as most commercial sources of light have a distribution which is practically symmetrical about an axis it is sufficient for practical purposes to take photometric readings about a great circle passing through the poles of the axis of symmetry, and thus determine the intensity.

To take individual readings all around the circle is a laborious process and, moreover, not reliable, since during the time of taking the readings, the intensity of the light may change and, in fact, does change in some forms of lamps—as, for instance, the electric-arc lamp.

In order to determine the intensity about a great circle at one reading, I have devised an integrating photometer, in which one or more series of mirrors are arranged about the light in a great circle which passes through the axis of symmetry of the light. The mirrors are set so that each reflects the image of the source to be measured on a photometric screen placed in the axis of the circle at some distance from the source. Each mirror or, in case the mirrors are arranged in pairs with respect to the symmetrical axis, each pair of mirrors may be considered as measuring the intensity of light of the zone which lies between planes passing perpendicular to the axis of symmetry midway between successive mirrors.

As the result which it is desired to obtain is the product of the intensity of light into the area over which that intensity exists, or rather the average of such a product, it is necessary that the intensity of the light which is obtained by the reflection in the mirror be multiplied by some factor which will give this desired result. As is well known, the spherical areas of zones formed by planes taken perpendicular to an axis of the sphere are proportional to the distance between such planes measured along the axis. Hence the area of zones marked out by successive planes separated from each other by equal distances are equal. I have therefore so placed my mirrors that they lie midway between planes which mark out zones of equal areas. As a result the average of the intensities given by the mirrors will give the desired result, since each mirror or each pair of mirrors gives the average intensity which exists over one of a series of equal areas.

For a better understanding of my invention reference may be had to the accompanying drawings, in which I have illustrated forms of my invention.

Figure 1 is a perspective view showing the general arrangement of a photometer embodying my invention. Fig. 2 is a diagram showing one arrangement of the mirrors. Fig. 3 is a diagram showing a modified arrangement. Fig. 4 is an elevation showing the support for the mirror, and Fig. 5 is a sectional view taken on the line 5 5 of Fig. 1, giving a different view of the mirror-supporting means.

A large circular or ring-shaped body 1 is provided as a support for the mirrors. This supporting-body, which may be made out of wood, metal, or other suitable material, is mounted on a pair of supporting-feet 2, which rest on the floor or other suitable base. I have shown a lamp 3 as the source of light which it is desired to measure. This lamp is placed at the center of the ring 1. In the drawings I have shown it supported by a hook and cord from the upper portion of the ring 1, although it is of course obvious that it might be supported independently of the ring, and in practice it would perhaps be preferable to so support it. A series of plane mirrors 4 are carried by the ring 1.

In Figs. 4 and 5 I have illustrated one means by which these mirrors may be supported. A pair of small uprights 5 are bolted or screwed to the inner surface of the ring 1. These uprights 5 have cup-shaped recesses formed near their outer end, in which a ball 6 is placed. To one side of the ball 6 the mirror 4 is secured in any suitable manner. A locking-screw 7 is provided by means of which the standards 5 can be drawn together to clamp the ball 6 in any desired position. By means of this construction a universal joint is obtained, and hence the mirrors can be adjusted in any desired manner. 8 represents a photometric screen which may be of any desired form. In the present instance I have shown it as provided with the conventional grease spot 9. A standard light 10 is shown back of the screen 8, slidingly mounted on a table 11.

The mirrors 4 are set at such an angle that the image of the lamp 3 will be reflected on the grease spot of the photometric screen 8. In Fig. 5 the mirror 4 is shown at about the angle it would have with the dimensions shown in the drawings. As will be readily understood, the mirrors will all be set so that they will be tangent to a cone, the axis of which coincides with the line connecting the grease spot 9 with the center of the circle 1. An opaque screen 12 is supported between the lamp 3 and the screen 8, so as to cut out the direct light from the lamp to the screen, but is of such proportion and is so placed as not to cut out the reflected light passing from any of the mirrors to the screen.

In the diagram shown in Fig. 2 the circle shown represents the outline of a sphere, at the center O of which is placed the luminous body to be measured. The line A B represents the axis of symmetry of this luminous body. In the present case it corresponds to the vertical diameter of the circle 1. The lines C D represent successive planes perpendicular to the line A B, separated each from its neighbor by equal distances $a$. Then, as is well understood, the area of the sphere lying between successive zones of the sphere represented by the lines C D will be equal. Midway between successive lines C D and between apexes A and B and the adjacent lines C D lines C' D' are drawn, and at the intersection of the lines C' D' with the circle the mirrors 4 are placed. With this construction it will be understood that the pair of mirrors at the ends of each line C' D' reflect the average intensity existing over the zone marked out by the adjacent planes C D. In this figure I have shown a sphere divided into twelve equal zones and provided with twelve pairs of mirrors.

In Fig. 3 is shown a diagram which in general is similar to that shown in Fig. 2, the right half being identical therewith and the left half different, in that the zones are different in number. In the present instance there are eight zones and eight mirrors on the left side and twelve zones and twelve mirrors on the right-hand side. By this arrangement, instead of obtaining the effect of two mirrors for twelve zones, I have obtained the effect of one mirror each for twenty zones.

In the practice of my invention the proper position of the mirrors 4 may be obtained by covering all but one and then so adjusting that one that the reflection on the lamp 3 will fall squarely on the spot 9 of the photometric screen 8. In order to obtain quantative measurements, it will of course be necessary to determine accurately the distance between the lamp 3 and the screen 8, as well as the distance from the lamp 3 to the mirror 4. It will also be necessary to take into account the amount of light which is not reflected by the mirror, but is lost by absorption, diffusion, or otherwise.

The mirrors should be made of glass of uniform quality; but it may be possible in some instances to correct slightly for different ratios of reflection by varying the vertical positions of the mirrors from that shown in the diagrams in Fig. 2 and Fig. 3—in other words, to diminish the area represented by the mirrors reflecting the lesser light and increasing the area represented in the mirrors, or another way in which this could be corrected would be by darkening some of the mirrors which reflected more light, so as to reduce those having the higher ratio of reflection to make them equal to those having the lower ratio.

The mirrors should be sufficiently large so that the entire image of the lamp 3 can be seen in each mirror from the spot 9. The greater the number of mirrors the more nearly the true average of the product could be obtained, though the error due to the finite number of mirrors which it is necessary to employ becomes inappreciable when as many as twelve zones are formed each provided with a mirror.

The intensity of light reflected in any one mirror can be readily determined by covering up the remaining mirrors, and the hemispherical intensity for the lower hemisphere can be readily obtained by apparatus employing only the lower half of the mirrors. Other modifications may be employed. With lights which may vary in their distribution on opposite sides of a great circle the arrangement shown in Fig. 2 is preferable, while for some purposes the arrangement shown in Fig. 3 is preferable with lights which approximate very closely to a symmetrical distribution about an axis.

In some instances it may be necessary to reduce the quantity of light which is reflected on the photometric screen. This may be done in any of the well-known ways.

It will of course be understood that where the distribution of light is sufficiently symmetrical it will only be necessary to employ mirrors placed on a semicircle at one side of the axis of symmetry. Many modifications may be made in the mechanical arrangements which I have shown without departing from the spirit of my invention. The form of lamp or other source of light which is to be measured is of course immaterial.

While the results which can be obtained by the use of my arrangement will only be highly accurate in those cases in which the light distribution is substantially symmetrical about an axis, it will be understood that useful results can be obtained by its use in measuring the luminosity of sources which do not give a symmetrical distribution of light. In such cases the source of light may be rotated with respect to the axis of the mirror-circle, which I have shown as vertical in the accompanying drawings.

In place of the simple photometric screen shown I may employ other forms of photometric screens, or I may use other devices—such as a spectroscope, bolometer, thermal couple, or the like—as the object upon which the reflections from the source of light or other radiation are directed by the various reflecting-surfaces, as I consider that my invention may be employed where it is desired to determine properties other than that of luminosity. Where in some of the claims I have used the expression "photometric screen" I intend it to include equivalent devices.

What I claim as new, and desire to secure by Letters Patent of the United States, is—

1. The combination with a light, of a photometric screen, and a series of mirrors arranged about said light and inclined to reflect the image of said light upon said screen, said mirrors being placed one each in the center of each of a series of zones of equal area, of an imaginary sphere surrounding said light as a center.

2. The combination with a light, of a photometric screen, and a series of mirrors arranged about said light, said mirrors being inclined to reflect the image of said light upon said screen, and so placed with reference to a series of zones of equal areas on an imaginary sphere surrounding said light that each of said mirrors reflects light of the average intensity existing over a corresponding zone of said series.

3. The combination with a light, of a photometric screen, and a plurality of series of mirrors arranged about said light, said mirrors being inclined to reflect the image of said light upon said screen and so placed with reference to a similar plurality of series of zones on an imaginary sphere surrounding said light that each of said mirrors reflects light of the average intensity existing over a corresponding zone, the zones of each series being equal in area.

4. The combination of a light to be measured, the distribution of which is substantially symmetrical about an axis, and a frame supporting a plurality of mirrors in a circle about said light, said mirrors being separated by equal distances as measured along one of the diameters of said circle.

5. The combination with an object to be illuminated, of a source of light and a series of mirrors arranged to reflect light upon said object from said source, the mirrors being so placed that the light reflected from each mirror represents the average intensity of light on one of a series of equal areas on the surface of an imaginary sphere surrounding said source.

6. The combination with a source of radiation, of an object and a series of reflecting devices for reflecting radiations from the source upon said object, said reflecting devices being so placed that each reflects radiation from the source of the average intensity which would exist on one of a series of equal areas on the surface of an imaginary sphere surrounding said source.

7. The combination with a source of radiation, of a series of reflecting devices so placed that each reflects radiations from the source of the average intensity which would exist on one of a series of equal areas on the surface of an imaginary sphere surrounding said source, and means for observing said reflected radiations.

8. The combination with a source of light, of a photometric device, and a series of mirrors unequally spaced in a circle about said source to reflect light upon said device proportional to the mean spherical candle-power of the source.

In witness whereof I have hereunto set my hand this 10th day of October, 1902.

CHARLES P. STEINMETZ.

Witnesses:
BENJAMIN B. HULL,
HELEN ORFORD.